(12) United States Patent
Benkreira et al.

(10) Patent No.: US 12,236,406 B2
(45) Date of Patent: *Feb. 25, 2025

(54) SYSTEMS AND METHODS FOR REAL-TIME, DISTRIBUTED PROCESSING OF GROUP BILL PAYMENTS

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,715

(22) Filed: Nov. 30, 2022

(65) Prior Publication Data
US 2023/0196316 A1    Jun. 22, 2023

Related U.S. Application Data

(63) Continuation of application No. 16/804,498, filed on Feb. 28, 2020, now Pat. No. 11,551,196, which is a continuation of application No. 16/030,047, filed on Jul. 9, 2018, now Pat. No. 10,614,440.

(51) Int. Cl.
| G06Q 20/00 | (2012.01) |
| G06Q 20/10 | (2012.01) |
| G06Q 20/22 | (2012.01) |
| G06Q 20/40 | (2012.01) |
| G06V 30/416 | (2022.01) |
| G06V 30/10 | (2022.01) |

(52) U.S. Cl.
CPC ........... *G06Q 20/102* (2013.01); *G06Q 20/29* (2013.01); *G06Q 20/4014* (2013.01); *G06V 30/416* (2022.01); *G06V 30/10* (2022.01)

(58) Field of Classification Search
CPC .. G06Q 20/102; G06Q 20/29; G06Q 20/4014; G06V 30/416
USPC ..................................................... 705/35–45
See application file for complete search history.

(56) References Cited

U.S. PATENT DOCUMENTS

| 2012/0173396 | A1* | 7/2012 | Melby ............... G06Q 20/102 705/40 |
| 2012/0210333 | A1* | 8/2012 | Potter .................. G06F 9/4843 719/313 |
| 2015/0073959 | A1* | 3/2015 | Connors ............... G06Q 40/00 705/35 |

\* cited by examiner

*Primary Examiner* — Hai Tran
(74) *Attorney, Agent, or Firm* — Foley & Lardner LLP

(57) ABSTRACT

Systems and methods are provided for group bill payment comprising creating a secure group bill payment account associated with a plurality of group members. The group bill payment account may be configured to receive information via a network from the plurality of group members; permit a group member to manage the group bill payment account following an authentication process; and transmit a group payment to a provider. Systems and methods may further comprise receiving instructions from a group member to create a rule for requesting payment, the bill being from a provider and associated with group members; receiving the bill issued by the provider; determining a charge based on the bill and the rule; sending a payment request based on the charge; receiving a deposit into the group bill payment account; transmitting a group payment; and sending a notification.

20 Claims, 5 Drawing Sheets

SYSTEMS AND METHODS FOR REAL-TIME, DISTRIBUTED PROCESSING OF GROUP BILL PAYMENTS

CROSS-REFERENCE TO RELATED APPLICATIONS

This application is a Continuation of U.S. patent application Ser. No. 16/804,498, filed on Feb. 28, 2020, which is a Continuation of U.S. patent application Ser. No. 16/030,047, filed on Jul. 9, 2018. The contents of which are hereby incorporated in their entirety by reference.

BACKGROUND

Many people need to split bills with other members of a group, i.e., to make a communal bill payment. For example, roommates, teammates, family members, friends, clubs, or other groups may receive a bill and need to split the cost based on criteria. Sometimes, these bills recur like, for example, a lease payment or a utility bill, and payment may be based on usage or other criteria.

Conventional methods for splitting bills often involve placing a bill in a single group member's name, even if multiple group members split the bill. Often, the responsible group member manually receives payment from other group members, for example by depositing checks into a checking account, and submits a single combined payment to the biller or provider. One problem is that conventional methods may require the responsible party to track payments and pay by the due date, an inconvenient, time-consuming effort. The amount owed by each party may be variable and difficult to calculate. Further, this approach relies on the responsible group member's honesty, diligence, and organizational skills. A payment error or missed payment by the responsible group member may negatively impact all group members. In addition, the responsible group member may be forced to send reminders to other group members for late payments or bounced checks, creating an undesirable social situation. A further problem with conventional methods is that group members whose names do not appear on the bill may have difficulty establishing an official or legal status like, for example, proof of residence. Further, the responsible party may be forced to assume an obligation to pay when the other group members are delinquent in payment. From these and other problems, it is apparent that conventional methods for splitting bills are inconvenient and create risks for all group members.

Some payment apps, software programs, online services, and other systems attempt to address some of these problems, but these systems suffer from deficiencies. For example, some systems function as simple payment schedulers or record-keepers, and in some cases may send reminder or confirmation notifications to group members. However, these programs may lack the ability to pay a provider directly and do not reduce the risks identified above. Further, these systems may not be scalable and react to events in real-time.

In view of the shortcomings and problems with traditional methods, an improved and unconventional system and method for splitting group bills that reduces risk and increases convenience is desired.

SUMMARY

The disclosed embodiments provide methods and systems for communal, or group, bill payment accounts. In particular, the disclosed unconventional systems and methods provide improvements over conventional systems and methods for splitting group bills that reduce risk and increase convenience.

Consistent with the present embodiments, a system for group bill payment is disclosed. The system may comprise a memory storing instructions and one or more processors. The one or more processors may be configured to execute the stored instructions to create a secure group bill payment account associated with a plurality of group members. The group bill payment account may be configured to receive information via a network from the plurality of group members, the information comprising a respective username, a respective password, and a respective member payment method; permit a group member to manage the group bill payment account following an authentication process; and transmit a group payment to a provider. The group bill payment server may receive instructions from a group member to create a rule for requesting payment from a group member to the group bill payment account. The bill may be from the provider and may be associated with the group members. In some embodiments, the group bill payment server receives the bill issued by the provider and generates an ephemeral container instance in response. The container instance may determine a group member charge based on the bill and the rule, and send a payment request to a group member based on the charge. The group bill payment account may receive a deposit from the group member based the payment request. The container instance may transmit the group payment from the group bill payment account to the provider, the group payment being based on the bill. The container instance may send a notification to the group member comprising information about a status of the group payment. The container instance may be terminated.

Consistent with the disclosed embodiments, a method is disclosed. The method may comprise creating a secure group bill payment system associated with a plurality of group members. The group bill payment system may be configured to receive information via a network from a plurality of group members, the information comprising a respective username, a respective password, and a respective member payment method. The group bill payment system may be configured to permit a group member to manage group bill payment account following an authentication process and transmit a group payment to a provider. The method may comprise receiving, by the group bill payment system, instructions from a group member to create a rule for requesting payment from a group member to the group bill payment account, the bill being from the provider and being associated with the group members. In some embodiments, the method comprises receiving, by the group bill payment system, the bill issued by the provider and generating an ephemeral container instance in response. The method may comprise determining, by the container instance, a group member charge based on the bill and the rule, and sending, by the container instance, a payment request to the group member based on the charge. The method may comprise receiving, by the group bill payment system, a deposit into the group bill payment account from the group member based on the payment request. The method may comprise, transmitting, by the container instance, the group payment from the group bill payment account to the provider, the group payment being based on the bill. The method may comprise sending, by the container instance, a notification to the group member comprising information about a status of the group payment. The method may comprise terminating the container instance.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve the convenience and reduce risks associated communal bill payment, i.e., group bill payments. To achieve these improvements in group bill payment systems and methods, the disclosed embodiments comprise creating a secure group bill payment account associated with a plurality of group members. The group bill payment account is configured to receive information via a network from the plurality of group members. The group bill payment account may be further configured to transmit a group payment to a provider. In some embodiments, the group bill payment account receives instructions from a group member to create a rule for requesting payment from a first group member to the group bill payment account, the bill being from the provider and being associated with the group members. The group bill payment server may determine a group member charge based on the rule and a received bill. In some embodiments, the group bill payment account sends a payment request to a group member based on the group member charge and receives a deposit into the group bill payment account from the group member based on the payment request. The group bill payment account may transmit the group payment from the group bill payment account to the provider and send a notification to the first group member, the notification comprising information about a status of the group payment.

In the embodiments, a group member may be a family member, a roommate, an employee, a business partner, a colleague, a friend, a club member, a team member, or other type of group member.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
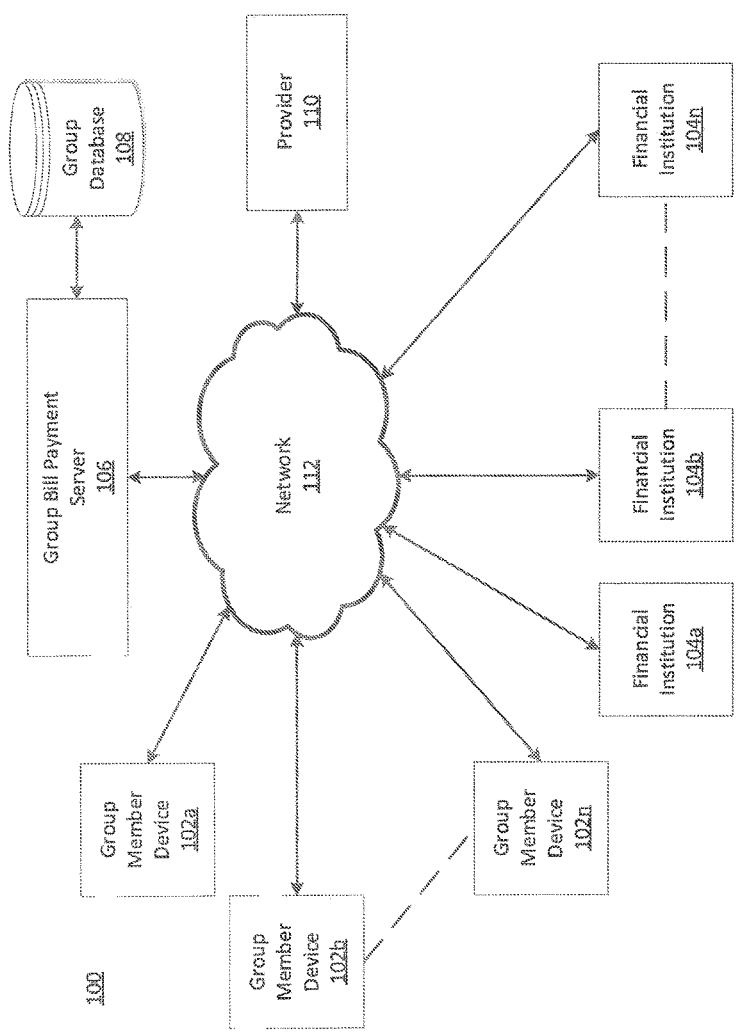
FIG. 1 is a diagram of an exemplary group bill payment system.

FIG. 1 is a diagram of an exemplary group bill payment system 100. In particular, FIG. 1 depicts a diagram of exemplary system 100, consistent with disclosed embodiments, revealing some technical aspects of the present disclosure for achieving the intended results of the present disclosure. System 100 is an example of a system group bill payment. By creating and using a group bill payment account configured to receive deposits and transmit payments to a provider, the embodiments allow for improved convenience and reduced risk in communal bill payment.

As shown in FIG. 1, system 100 may include a plurality of group member devices 102a, 102b, and 102n; a plurality of financial institutions 104a, 104b, and 104n; group bill payment server 106; group database 108; provider 110; and network 112. Components of system 100 are connected to each other through network 112.

FIG. 1 is an exemplary configuration of system 100. As will be appreciated by one skilled in the art, the components and arrangement of components included in system 100 may vary. For example, as compared to the depiction in FIG. 1, system 100 may include a larger or smaller number of group member devices, financial institutions, providers, group bill payment servers, or networks. In addition, system 100 may further include other components or devices not depicted that perform or assist in the performance of one or more processes consistent with the disclosed embodiments. The components and arrangements shown in FIG. 1 are not intended to limit the disclosed embodiments, as the components used to implement the disclosed processes and features may vary.

Figure 2:
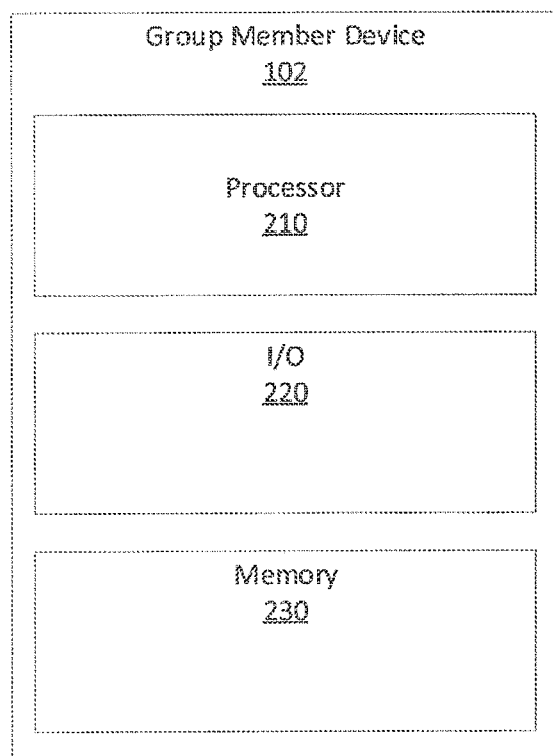
FIG. 2 is a diagram of an exemplary group member device, consistent with disclosed embodiments.

Referring to FIG. 1, a group member may use one or more group member devices 102a-n. Group member devices 102a-n may be personal computers, mobile devices, smartphones, tablets, or the like. An exemplary embodiment of group member device 102a-n is depicted in FIG. 2 and described below.

Consistent with disclosed embodiments, group member devices 102a-n may be used to access systems associated with group bill payment server 106, a financial institution 104, or a provider 110. In some embodiments, a group member using one of group member devices 102a-n logs into group bill payment server 106 with a method of authentication. For example, group member devices 102a-n may be configured to allow the user to perform an authentication process comprising providing a credential. The credential may comprise at least one of a username, a password, a pin, an answer to a security question, a selection of a picture, a card swipe, a proximity card scan, a token, a one-time password, speech, a signature, a keyboarding rhythm, a fingerprint, a biometric identifier, or another credential.

In some embodiments, group member devices 102a-n are configured to retrieve and transmit data to and from the other components of system 100. For example, group member devices 102a-n may be configured to retrieve or update a group bill payment account status, payment information, provider service data, or other data from at least one of group bill payment server 106, financial institutions 104a-n, or provider 110. Group member devices 102a-n may be configured to access group bill payment server 106 and create a group member user account and a group bill payment account. In some embodiments, group member devices 102a-n may be configured to access group bill payment server 106 and assign a group bill payment account manager.

In some embodiments, a group member using a group member device 102a-n accesses group bill payment server 106 to configure at least one of a payment to provider 110 or a deposit from a financial institution. The payment and deposit may be configured for immediate transfer, for a scheduled transfer, or for recurring scheduled transfer.

In some embodiments, group member devices 102*a-n* are configured to send and receive messages or notifications via network 112 to and from components of system 100, in including to and each other, to and from group bill payment server 106, to and from financial institutions 104*a-n*. For example, group member devices 102*a-n* may send or receive a notification to another component of system 100 comprising at least one of a provider payment status, a group member deposit status, or a group bill payment account balance. In some embodiments, a group member using a group member device 102*a-n* may conduct chat sessions with another group member using another group member device 102*a-n*. As one of skill in the art will appreciate, other forms of communication between components of system 100 are possible.

In the embodiment of system 100, financial institutions 104*a-n* comprise a server comprising one or more processors, one or more input/output (I/O) devices, and a memory. Financial institutions 104*a-n* connected to network 112 and may comprise at least one of a checking account, a savings account, a credit card account, or other financial account. The financial accounts may be associated with one or more group members. The financial accounts and user accounts may be associated with a provider.

Financial institutions 104*a-n* are capable of completing an electronic transaction. In some embodiments, financial institutions 104*a-n* may be capable of performing millions of transactions per day or more. Financial institutions 104*a-n* are configured to receive a deposit in a financial account and make a payment from the financial account.

Financial institutions 104*a-n* may comprise an online platform for accessing a financial account. For example, a group member using group member device 102*a-n* may use an online platform to check an account status, make a deposit into the financial account, or make a payment from the financial account.

In some embodiments, financial institutions 104*a-n* use secure authentication processes. For example, a financial institution 104*a-n* may require a group member using a group member device 102*a-n* or a provider 110 to perform an authentication process before data relating to a financial account. The authentication process may comprise providing a credential. The credential may comprise at least one of a username, a password, a PIN, an answer to a security question, a selection of a picture, a card swipe, a proximity card scan, a token, a one-time password, speech, a signature, a keyboarding rhythm, a fingerprint, a biometric identifier, or another credential.

In some embodiments, financial institutions 104*a-n* are configured to perform Payment Card Industry (PCI) compliant transactions or to perform transactions compliant with other standards. In some embodiments, financial institutions 104*a-n* may comprise an e-commerce payment system configured to perform transactions including at least one of a credit card transaction, a debit card transaction, a smart card transaction, an E-wallet transaction, a NetBanking® transaction, a mobile payment, an AmeriCommerce® transaction, an Amazon Pay® transaction, a Visa Pay® transaction, an Apple Pay® transaction or the like. As one of skill in the art will appreciate, financial institutions 104*a-n* may be configured to perform electronic transaction using still other methods.

In some embodiments, financial institutions 104*a-n* use encryption methods to send information to and from other components of system 100. Financial institutions 104*a-n* may use encryption methods to send data, to send messages, or to complete transactions.

As depicted in FIG. 1, group bill payment server 106 is connected to network 112. Group bill payment server 106 comprises one or more processors, one or more input/output (I/O) devices, and a memory. In some embodiments, group bill payment server 106 is hosted on a cloud compute service.

In some embodiments, group bill payment server 106 is configured to allow a user accessing group bill payment server 106 through network 112 using one of group member devices 102*a-n*. In some embodiments, group bill payment server 106 is configured to create a plurality of user accounts associated with respective group members and may be further configured to create one or more provider accounts associated with provider 110.

In some embodiments, group bill payment server 106 is configured to create a secure group bill payment account associated with a plurality of group members. Group bill payment server 106 may be capable of linking the group bill payment account to an external bank account. In some embodiments, the external bank account may carry a group bill payment account balance to be used for future payments.

In some embodiments, group bill payment server 106 is configured for receiving instructions from a group member using one of group member devices 102*a-n*. For example, group bill payment server 106 may receive instructions to create a rule for requesting payment from a group member to the group bill payment account.

In some embodiments, group bill payment server 106 may be configured to receive a bill associated with group members from a provider. In some embodiments, receiving the bill comprises receiving an image file and using optical character recognition to generate text data based on the image file. In some embodiments, accessing an email account using a credential; and automatically detecting an email in the email account from the provider, wherein the email contains electronic billing information. In some embodiments, group bill payments server 106 is configured to receive a bill directly from provider 110. In some embodiments, group bill payments server 106 receives information about bills through manual entry from group member devices 102*a-n*. In some embodiments, group bill payments server 106 can receive bill information from financial institutions 104*a*-.

In some embodiments, group bill payment server may be configured to determine a group member charge based on a bill from a provider and a rule. The rule may be based on a predetermined percentage, an income, or a usage rate.

In some embodiments, group bill payment server 106 is configured to send requests for payment to group member devices 102*a-n*. The request may comprise at least one of an email, a text message, a push notification, a direct debit from a bank account, or a charge to a credit card. Group bill payment server 106 may be configured to send a notification to any group member based on nonpayment by one of the group members.

Group bill payment server 106 may be capable of transmitting a payment. In some embodiments, group bill payment server 106 may comprise an e-commerce payment system. Transmitting the payment may comprise completing an electronic transaction. For example, the group bill payment account may complete a credit card transaction, a debit card transaction, a smart card transaction, an E-wallet transaction, a NetBanking® transaction, a mobile payment, an AmeriCommerce® transaction, an Amazon Pay® transaction, a Visa Pay® transaction, an Apple Pay® transaction or the like. In some embodiments, Group bill payment server 106 transmits a lump payment to a provider comprising a plurality of group bill payments associated with respective groups.

Consistent with disclosed embodiments, group bill payment server 106 may be configured to receive a deposit from financial institutions 104a-n and transmit a group payment to provider 110. Transmitting a payment may comprise automatically printing a check and sending the check to provider 110 via at least one of a courier service or postal service. In some embodiments, transmitting a payment comprises generating a digital image of a check and transmitting the digital image to provider 110.

In some embodiments, group bill payment server 106 makes a payment to one or more financial institutions to an account associated with provider 110.

In some embodiments, group bill payment server 106 is a component of a financial institution. The financial institution may be capable of carrying a group bill payment account balance to be used for future payments. In an embodiment not depicted in FIG. 1, group bill payment server 106 may be a component of one of financial institutions 104a-n.

In some embodiments, a user or a provider may be required to complete an authentication processes that comprises providing a credential before accessing group bill payment server 106. The credential may comprise at least one of a username, a password, a pin, an answer to a security question, a selection of a picture, a card swipe, a proximity card scan, a token, a one-time password, speech, a signature, a keyboarding rhythm, a fingerprint, a biometric identifier, or another credential.

In some embodiments, group bill payment server 106 uses encryption methods to send information to and from other components of system 100 or components outside system 100. Group bill payment account server 106 may use encryption methods to send or retrieve data, to send messages, to complete transactions, or to perform other operations.

In some embodiments, group bill payment server 106 is configured to perform at least one of Payment Card Industry (PCI) compliant transactions, Automated Clearing House (ACH) transactions, or transactions compliant with other standards. PCI is an information security standard for organizations that handle credit card transactions. PCI is a standard to increase security of cardholder data to reduce credit card fraud. PCI compliant institutions must validate compliance annually, by an external Qualified Security Assessor (QSA) or by an Internal Security Assessor (ISA) that creates a Report on Compliance. PCI compliance is mandatory for certain credit card brands and typically required of organizations handling large volumes of transactions. PCI Data Security Standard requirements comprise: building and maintaining secure network and systems; protecting cardholder data; maintaining a vulnerability management program; implementing strong access control measures; monitoring and testing networks; maintaining an information security policy. As one of skill in the art will appreciate, other group bill payment server 106 may be configured to comply with other standards.

As one of skill in the art will appreciate, group bill payment server 106 may be configured to perform electronic transactions using still other methods.

Consistent with the present disclosures, in some embodiments group bill payments server 106 is hosted on a cloud compute service and generates container instances in response to triggering events to perform disclosed methods. In some embodiments, the triggering event is generated by a messaging queue service or data streaming platform. Advantageously, container instances are ephemeral, with their provisioning based on a triggering event and their terminating based on completion of one or more jobs comprising the performance of disclosed methods. In some embodiments, the triggering event is receiving a bill from a provider. In some embodiments, the triggering event is the passage of a predetermined date and time.

Referring again to FIG. 1, system 100 may comprise group database 108 connected to group bill payment server 106. Database 108 comprises one or more memory units. In some embodiments, Database 108 may be implemented as one or more databases configured to store datasets. The datasets, in some embodiments, may be associated with group bill payment accounts, group member accounts, providers, and financial institutions. For example, database 108 may store group bill payment account balances, financial account credentials, provider account credentials, email credentials, a group member account payment method. Database 108 may be implemented using document management systems, SQL databases utilizing Microsoft® SQL Server® engines, SharePoint® databases, Oracle® databases, Sybase™ databases, or other relational databases, or non-relational databases such as key-value stores or NoSQL databases such as Apache® HBase™ In some embodiments, database 108 may comprise an associative array architecture, such as a key-value storage, for storing and rapidly retrieving large amounts of information.

In some embodiments, not shown in FIG. 1, group database 108 is a component of group bill payment server 106.

As depicted in FIG. 1, provider 110 is connected to network 112. Provider 110 may be a business, a landlord, a mortgage lender, an insurance provider, a bank, a credit card company, a utility provider, an Internet Service Provider, a cable provider, a service provider, a non-profit organization, a school, a charity, an entertainment venue, a membership organization, a food club, a drink club, or other provider of goods or services. Not shown in detail in FIG. 1, provider 110 may comprise an organization, an agent acting on behalf of the organization, or a device or computer system configured to perform operations. As one of skill in the art would understand, provider 110 may comprise still other examples.

In some embodiments, provider 110 is configured to receive an electronic payment directly from group bill payment account 106 via network 112. Alternatively or additionally, provider 110 may be configured to receive an electronic payment from group bill payment account 106 via network 112 at a financial account held with one of financial institutions 104a-n. In some embodiments, provider 110 may be configured to receive a check. In some embodiments not shown, provider 110 may not be connected to network 112 and may be capable of receiving a check.

In some embodiments, provider 110 sends a bill. In some embodiments, sending a bill comprises at least one of mailing a paper bill to an address, emailing a bill to at least one of a group member or group bill payment account server 106, sending a notification to a group member, or allowing a group member or other user to download a bill. In some embodiments, the notification is a text message, an email, or a push notification.

In some embodiments, provider 110 may complete an authentication process that comprises providing a credential before accessing group bill payment server 106 or accessing one of financial institutions 104a-n. The credential may comprise at least one of a username, a password, a pin, an answer to a security question, a selection of a picture, a card swipe, a proximity card scan, a token, a one-time password, speech, a signature, a keyboarding rhythm, a fingerprint, a biometric identifier, or another credential.

In the embodiment of system 100, network 112 may be a public network or private network. Network 112 may be, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet) or the like. Group member devices 102a, financial 104a-n, group bill payment server 106, and provider 110, may connect to network 112. In some embodiments, network 112 may be secure and require a password to access the network.

FIG. 2 is a diagram of an exemplary group member device, consistent with disclosed embodiments. In some embodiments, group member device 102 is a personal computer, a mobile device, a smartphone, a tablet, or the like.

As shown in FIG. 2, group member device 102 comprises a comprises one or more processors 210, one or more input/output (I/O) devices 220, and a memory 230.

Processor 210 may be one or more known or custom processing devices designed to perform functions of the disclosed methods, such as a single core or multiple core processors capable of executing parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

I/O devices 220 may also include one or more communication modules (not shown) for sending and receiving information from other components in system 100 by, for example, establishing wired or wireless connectivity between group member device 102 and network 112. Exemplary communication modules as I/O devices 220 may include, for example, a short-range or near field wireless communication modem, a Wi-Fi communication modem, or a cellular communication modem.

In some embodiments, group bill payment server 106 is hosted on a cloud compute service. Examples of cloud compute service that may host group bill payments server 106 include AWS Lambda by Amazon®, Oracle Cloud®, Cloud Functions® by Google®, Azure Functions® by Microsoft®, Apache OpenWhisk®, or other cloud compute services. In some embodiments, to perform methods disclosed herein, users may interact with native cloud compute service functions through terminals or shells using tools like, for example, AWS® Command Line Interface, Google's® gcloud command line tool, or Secure Shell (SSH).

In some embodiments, group bill payment server 106 includes a messaging queue service. For example, group bill payment server 106 may comprise at least one of Amazon Simple Queue Service (Amazon SQS®), RabbitMQ, Apache ActiveMQ®, RocketMQ®, or other messaging queue service. The messaging queue service may be configured to send messages between two or more clients and may support cross language clients and protocols in JAVASCRIPT, C, C++, JAVA, PHP, PYTHON, RUBY, PERL, BASH, or the like. The messaging queue service may generate a triggering event in response to at least one of receiving a bill, receiving a notification from a group member device, receiving a notification from a provider, receiving a notification from a financial institution, or the passage of a predetermined date and time.

Group bill payment server 106 may comprise a distributed streaming platform used alternatively to or in combination with a messaging queue service. For example, group bill payment server 106 may comprise at least one of Amazon Kinesis Data Streams®, Apache Kafka®. Azure Events Hub®, Google Cloud DataFlow, or other distributed streaming platform. The distributed streaming platform may be configured to publish and subscribe to data streams, store data streams, and process data streams in real time. In some embodiments, the distributed streaming platform generates a triggering event in response to at least one of receiving a bill, receiving a notification from a group member device, receiving a notification from a provider, receiving a notification from a financial institution, or the passage of a predetermined date and time.

In some embodiments, group bill payment server 106 is hosted on a cloud compute service and is configured to generate ephemeral container instances in response to triggering events. In some embodiments, the triggering event is generated by a messaging queue service or data streaming platform. In some embodiments, the triggering event is generated in response to receiving a bill. In some embodiments, the trigger event is the passage of a predetermined date and time. In some embodiments, the trigger event is generated in response to receiving a notification from at least one of a group member device, a provider, or a financial institution. In some embodiments, a container instance may be an AWS Lambda® compute instance, Oracle Cloud® compute instance, Google Cloud Functions® virtual machine, Microsoft Azure Functions® host instance, Apache OpenWhisk® instance, or other container instance.

A container instance, in some embodiments, may comprise a stand-alone, executable package that includes code, runtime, system tools, system libraries, and settings that is configured to execute a job, the job performing methods disclosed herein. A container instance may be scaled by functions of a cloud compute service to include a number of processors and an amount of memory based on an estimated size of a job. A container instance may be configured to execute functions written in one or more programming languages, including JAVASCRIPT, C, C++, JAVA, PHP, PYTHON, RUBY, PERL, BASH, or other programming or scripting languages. Container instances are ephemeral and may run for a single job or a series of jobs, and data stored by container instance may be destroyed upon termination, providing security advantages.

Advantageously, a container instance may be a closed container. That is, a container instance may block attempts to access the container and not permit access from outside using terminals or remote shell tools like SSH, RTP, FTP, or Curl, for example. Accordingly, a container instance provides security benefits to system 100 by protecting personal or financial information.

Group member device 102 may comprise memory 230 that includes one or more storage devices configured to store information used by processor 210 (or other components) to perform certain functions related to the disclosed embodiments. In one example, group member device 102 may include memory 230 that includes instructions to enable processor 210 to execute one or more applications, such as server applications, a call hosting application, a messaging application, an electronic transaction application, an account status application, network communication processes, and any other type of application or software known to be available on computer systems. Alternatively or additionally, the instructions, application programs, etc. may be stored in an internal database or external storage (not shown) in direct communication with group member device 102, such as one or more databases or memory accessible over network 112. A database or other external storage may be a volatile or non-volatile, magnetic, semiconductor, tape, optical, removable, non-removable, or other type of storage device or tangible (i.e., non-transitory) computer-readable medium.

Figure 3:
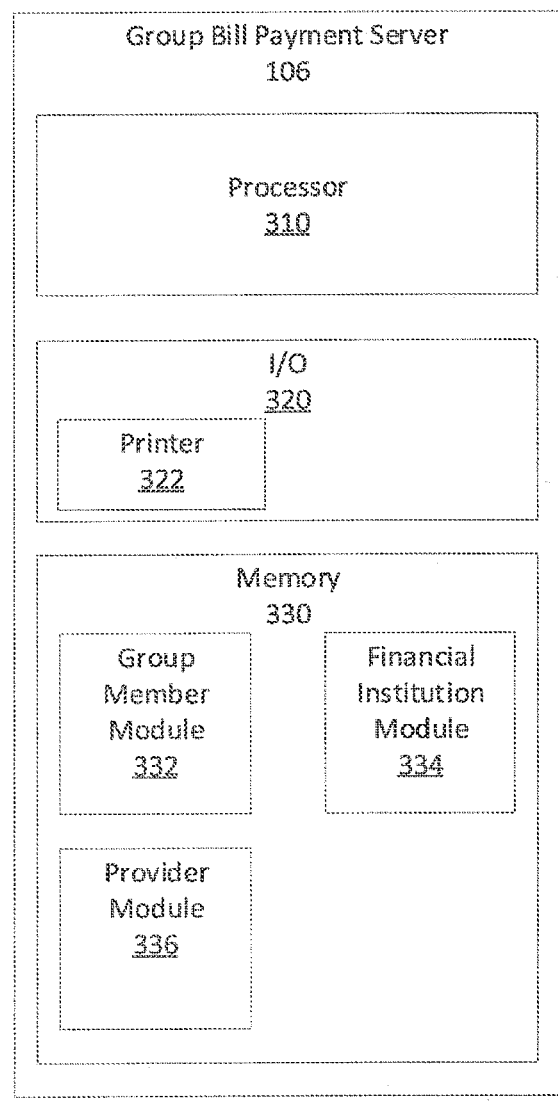
FIG. 3 is a diagram of an exemplary group bill payment server.

FIG. 3 is a diagram of an exemplary group bill payment server 106, consistent with disclosed embodiments.

In some embodiments, group bill payment server 106 may be on a single server, a cluster of servers configured for parallel processing, multiple server clusters, or a cloud service. Group bill payment server 106 may be hosted on a private or public network and may further be on a cloud. As one of skill in the art will appreciate, other arrangements are possible, consistent with disclosed embodiments.

As shown in FIG. 3, group bill payment server 106 comprises one or more processors 310, one or more I/O devices 320, and a memory 330. I/O devices may comprise a printer. Memory 330 may include at least one of group member module 332, financial institution module 334, or provider module 336.

Processor 310 may be one or more known or custom processing devices designed to perform functions of the disclosed methods, such as a single core or multiple core processors capable of executing parallel processes simultaneously. For example, processor 310 may be a single core processor configured with virtual processing technologies. In certain embodiments, processor 310 may use logical processors to simultaneously execute and control multiple processes. Processor 231 may implement virtual machine technologies, or other known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Group bill payment server 106 may include one or more storage devices configured to store information used by processor 310 (or other components) to perform certain functions related to the disclosed embodiments. In one example, group bill payment server 106 may include memory 330 that includes instructions to enable processor 310 to execute one or more applications, such as server applications, a call hosting application, a messaging application, an electronic transaction application, an account status application, network communication processes, and any other type of application or software known to be available on computer systems. Alternatively or additionally, the instructions, application programs, etc. may be stored in an internal database or external storage (not shown) in direct communication with group bill payment server 106, such as one or more databases or memory accessible over network 112. A database or other external storage may be a volatile or non-volatile, magnetic, semiconductor, tape, optical, removable, non-removable, or other type of storage device or tangible (i.e., non-transitory) computer-readable medium.

In one embodiment, group bill payment server 106 may include memory 330 that includes instructions that, when executed by processor 310, perform one or more processes consistent with the functionalities disclosed herein. Methods, systems, and articles of manufacture consistent with disclosed embodiments are not limited to separate programs or computers configured to perform dedicated tasks. For example, group bill payment server 106 may include memory 330 that may include one or more programs to perform one or more functions of the disclosed embodiments, including the functions performed by member module 332, financial institution module 334, or provider module 336. Moreover, processor 310 may execute one or more programs located remotely from system 100. For example, group bill payment server 106 may access one or more remote programs, that, when executed, perform functions related to disclosed embodiments.

As depicted in FIG. 3, I/O devices 320 may comprise printer 322 configured to print a check. I/O devices 320 may also include one or more communication modules (not shown) for sending and receiving information from other components in system 100 by, for example, establishing wired or wireless connectivity between group bill payment server and network 112. Exemplary communication modules as I/O devices 310 may include, for example, a short-range or near field wireless communication modem, a Wi-Fi communication modem, or a cellular communication modem. As one of skill in the art will appreciate, to perform functions disclosed in the embodiments, I/O devices 320 may comprise other devices not depicted in FIG. 3.

Still referring to FIG. 3, memory 330 may comprise group member module 332, financial institution module 334, and provider module 336.

Group member module 332 may be configured to create, modify, or delete user accounts and group bill payment accounts, consistent with disclosures made in reference to FIG. 1. In some embodiments, member module 332 is configured to send notifications to group members. For example, group member module 332 may be configured to send and receive data to and from one of group member devices 102a-n. Group member module 332 may be configured to generate a rule for group bill payment. Consistent with disclosed embodiments and as depicted in FIG. 3, member module 332 may be configured to require and accept an authentication credential. As disclosed above with respect to FIG. 1, member module 332 may be configured to send and receive encrypted data to and from at least one of a group member device 102a-n, a financial institution 104a-n, or provider 110.

Still referring to FIG. 3, financial institution module 334 may be configured to make and receive payments to and from a financial institution like, for example, financial institutions 104a-n associated with a group member or a provider.

Referring to FIG. 3, provider module 336 may be configured to create, modify, or delete provider accounts, consistent with disclosures made in reference to FIG. 1. In some embodiments, provider module 336 is configured to send notifications to providers. For example, provider module 336 may be configured to send and receive data to and from a device associated with provider 110. Consistent with disclosed embodiments and as depicted in FIG. 3, provider module 336 may be configured to require and accept an authentication credential. As disclosed above with respect to FIG. 1, provider module 336 may be configured to send and receive encrypted data to and from at least one of a group member device 102a-n, a financial institution 104a-n, or group bill payment account server 106.

Figure 4:
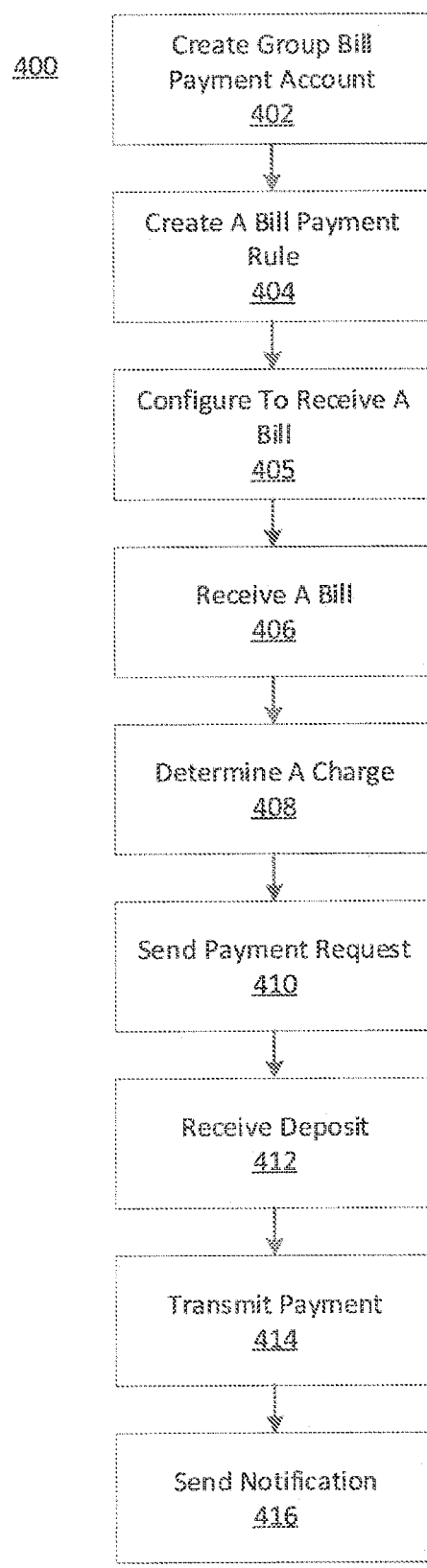
FIG. 4 is a flowchart of an exemplary process for group bill payment, consistent with disclosed embodiments.

FIG. 4 is a flowchart of an exemplary process 400 for group bill payment, consistent with disclosed embodiments performed by group bill payment server 106.

At step 402, group bill payment server 106 creates a group bill payment account associated with a plurality of group members. In some embodiments, creating a group bill payment account comprises receiving information via network 112 from one of the group member devices 102a-n. The information may comprise at least one of a credential or a member payment method. In some embodiments, step 402 comprises adding or removing group members from the group bill payment account.

In some embodiments, group bill payment server stores user account information and group bill payment account information on group database 108.

In some embodiments, step 402 may comprise assigning or modifying a privilege of a group member. For example, step 402 may comprise assigning a group member to manage the group bill payment account following an authentication process. In some embodiments, a plurality of group members may be assigned managing privileges. In some embodiments, the authentication process comprises sending a token to group bill payment server 106. In some embodiments, the token may have been previously received from at least one of group bill payment server 106 or a remote token server (not depicted in the figures).

In some embodiments, step 402 comprises linking an external bank account held, for example, in one of financial institutions 104a-n.

In some embodiments, step 402 may comprise receiving information associated with a provider comprising at least one of a provider deposit account, a provider address, a provider email address, or a credential associated with a user account hosted by a provider.

In some embodiments, group bill payment account 106 is hosted on a cloud compute service, and, at step 402, a user may interact with native cloud compute service functions through terminals or shells using tools like, for example, AWS® Command Line Interface, Google's® gcloud command line tool, or Secure Shell (SSH).

Step 404 comprises receiving instructions from a group member to create a group bill payment rule.

In some embodiments, the instructions to create a group bill payment rule at step 404 comprises at least one of an amount due by a group member or a percentage of a bill owed by a group member. In some embodiments, the amount due may be a fixed amount. In some embodiments, the percentage may be one of a predetermined percentage, a percentage based on an income, or a percentage based on a usage rate. For example, the predetermined percentage may be a fixed percentage of a variable utility bill owed by the group member. In some embodiments, the percentage based on income may be proportional to the ratio of the income of the group member to the total income of all group members.

In some embodiments, the percentage based on a usage rate may be the relative proportion of data used by one or more user devices associated with the group member in a shared internet data plan. In some embodiments, the percentage based on a usage rate comprises identifying an area associated with a user in a floor plan uploaded to payment server 110. In some embodiments, the percentage based on a usage rate is based on a number of hours, days, months, or other scheduling factor. For example, a group member may occupy an apartment only on weekends, and the group bill payment rule may be based on the number of weekend-days in a month.

In some embodiments, the group bill payment rule comprises a rule to pay a predetermined amount on a predetermined schedule. For example, the group bill payment rule may comprise paying a predetermined amount on the first business day of every month.

In some embodiments, step 404 comprises establishing a payment account associated with a group member to be used at step 410 when sending a payment request. For example, in some embodiments, at step 404, a user may provide at least one of a direct debit account, a bank account withdrawal, a credit card, or other information to facilitate another electronic transaction. For example, the group bill payment account may complete a credit card transaction, a debit card transaction, a smart card transaction, an E-wallet transaction, a NetBanking® transaction, a mobile payment, an AmeriCommerce® transaction, an Amazon Pay® transaction, a Visa Pay® transaction, an Apple Pay® transaction or the like.

In some embodiments, step 404 comprises instructions to automatically send a request to an established payment account at step 410 and automatically receive a deposit at step 412.

In some embodiments, step 404 comprises instruction to create a group bill payment account balance by sending a group bill payment request to a group member prior to receiving a bill. In some embodiments, step 404 comprises granting group bill payment server 106 access to a line of credit to be used in the event of nonpayment by a group member. In some embodiments, step 404 comprises instructions to send a payment request to a guarantor in the event of nonpayment by a group member. For example, a guarantor could be one of the group members, a relative of a group member, or other person associated with a group member.

In some embodiments, step 404 comprises modifying an existing rule. As will be appreciated by one of skill in the art, step 404 may comprise other operations consistent with disclosed embodiments.

In some embodiments, group bill payment account 106 is hosted on a cloud compute service, and, at step 404, a user may interact with native cloud compute service functions through terminals or shells using tools like, for example, AWS® Command Line Interface, Google's® gcloud command line tool, or Secure Shell (SSH).

Step 405 comprises configuring group bill payment server 106 to receive a bill.

In some embodiments, at step 405, a group member using a group member device 102 configures the group payment server 106 to access an account managed by provider 110 following an authentication protocol. For example, the group member may provide a website address, a username, and a password for accessing an account managed by provider 110. Further, in some embodiments, the group member may provide instructions for downloading the bill.

In some embodiments, at step 405, group bill payment server 106 may be configured to process a bill using optical character recognition (OCR). For example, the group member may provide instructions for identifying at least one of a charge or a due date following an OCR conversion of an image file.

In some embodiments, at step 405, the group bill payment server 106 is configured to retrieve an email comprising a bill. For example, a group member may provide group bill payment server 106 with at least one of an email account username or an email account password, and further provide instructions for processing an email comprising a bill associated with provider 110. The instructions may comprise at least one of a provider name, a rule for identifying a charge amount, a rule for identifying a due date, instructions to identify a charge in the text of an email, or instructions to identify a charge in an attachment.

In some embodiments, group billing server 106 is hosted on a cloud compute service and step 405 comprises cloud compute instructions to spin up, that is, generate, a container instance upon a triggering event. In some embodiments, the triggering event is generated by a messaging queue service or data streaming platform. The triggering event may be one of receiving a bill from a user device 102*a-n*, receiving a bill from a provider 110, receiving instructions to retrieve a bill from a group member device 102, or the passage of a predetermined date and time. Consistent with the present disclosure, in some embodiments, step 405 comprises providing instructions to the container instance or the to automatically terminate the container instance upon completion of a job, the job comprising at receiving a bill and at least one of steps 408-416.

In some embodiments, at step 405, a user may interact with native cloud compute service functions through terminals or shells using tools like, for example, AWS® Command Line Interface, Google's® gcloud command line tool, or Secure Shell (SSH).

In some embodiments, the group bill payment rule created at step 404 comprises sending a predetermined payment amount on a predetermined schedule, and step 405 may be skipped.

Step 406 comprises receiving a bill associated with a provider and a group bill payment account. Receiving a bill comprises receiving a bill from at least one of a group member device 102*a-n* or from provider 110. In some embodiments, receiving a bill comprises receiving instructions comprising at least one of an amount due, a due date, a provider, or provider payment information. In some embodiments, the instructions are received from a user logged into at least one of a user account or a group bill payment account. In some embodiments, receiving a bill comprises receiving an image file and using OCR to generate text data based on the image file. In some embodiments, receiving a bill comprises accessing an email account using a credential. In some embodiments, receiving a bill comprises automatically detecting an email in the email account from the provider, wherein the email contains electronic billing information.

In some embodiments, the bill comprises a fixed charge that does not vary in amount for each billing cycle. In some embodiments, the bill comprises a variable charge that varies in amount for each billing cycle.

In some embodiments, step 406 is performed by a container instance generated, by group bill payment server 106, in response to a triggering event, based on cloud compute instructions disclosed in reference to step 405. In some embodiments, the container instance may be generated within milliseconds of a triggering event.

In some embodiments, the group bill payment rule created at step 404 comprises sending a predetermined payment amount on a predetermined schedule, and step 406 is skipped.

As will be appreciated by one of skill in the art, consistent with disclosed embodiments, creating a rule may comprise other logical constraints based on information associated with at least one of a provider, a bill, a schedule, a group member, or a payment method.

Step 408 comprises determining a charge to a group member based on the rule. Determining a charge comprises applying the rule created at step 404. In some embodiments, the charge is further based on the received bill or electronic billing information. For example, group bill payment server 106 may determine a charge of $40.00 to a group member by applying a rule to assign 30% of a received utility bill that varies each billing cycle to a group member, wherein the received utility bill totaled $120.00. As another example, group bill payment server 106 may determine a charge by applying a rule that a group member owes a fixed fee of $500.00 for rent. In some embodiments, step 408 is performed by a container instance generated at step 406.

Step 410 comprises sending a payment request. In some embodiments, sending the payment request comprises at least one of an email, a text message, a push notification, or sending a payment request to an established payment account. Sending a payment request to an established payment account may comprise, for example, a direct debit from a bank account, or a charge to a credit card.

In some embodiments, step 410 is performed by a container instance generated at step 406.

In some embodiments, step 410 is performed in anticipation of a bill, based on a rule created at step 404, prior to at least one of steps 406 or 408. In these embodiments, a group bill payment account balance may be generated.

Step 412 comprises receiving a deposit from a group member into the group bill payment account. In some embodiments, receiving a deposit comprises at least one of receiving a check, receiving a wire transfer, a receiving a direct debit, performing a bank withdrawal from a linked bank account, charging a credit card, or other transaction. For example, the group bill payment account may complete a credit card transaction, a debit card transaction, a smart card transaction, an E-wallet transaction, a NetBanking® transaction, a mobile payment, an AmeriCommerce® transaction, an Amazon Pay® transaction, a Visa Pay® transaction, an Apple Pay® transaction or the like.

In some embodiments, step 412 is performed by a container instance generated at step 406.

Step 414 comprises transmitting a group payment.

In some embodiments, transmitting a group payment at step 414 comprises transferring funds from group bill payment account 106 to one of a provider or a financial institution associated with a provider. In some embodiments, transmitting a group payment comprises sending an electronic payment. For example, the group bill payment account may complete a credit card transaction, a debit card transaction, a smart card transaction, an E-wallet transaction, a NetBanking® transaction, a mobile payment, an AmeriCommerce® transaction, an Amazon Pay® transaction, a Visa Pay® transaction, an Apple Pay® transaction or the like. In some embodiments, transmitting a group payment comprises automatically generating and sending a check. Generating a check may comprise printing a check with printer 322. Sending a check may comprise sending a check by one of a courier service, a postal service, or other means. In some embodiments, transmitting a group payment is performed prior to step 412.

In some embodiments, step 414 is performed by a container instance generated at step 406.

Step 416 comprises sending a notification. In some embodiments, the notification comprises at least one of an email, a text message, or a push notification. In some embodiments, the notification comprises a payment status. In some embodiments, step 416 is performed by a container instance generated at step 406.

In some embodiments not depicted in FIG. 4, based on nonpayment by a group member, process 400 further comprises sending a second payment request to the group members. In some embodiments, process 400 comprises sending a nonpayment notification to another group member. In some embodiments, the nonpayment notification comprises at least one of sending an email, a text message, or a push notification. In some embodiments, in the event of nonpayment by a group member, group bill payment server 106 transmits a payment to provider 110 at step 408 using funds available in at least one of a group bill payment account balance, a line of credit, or a payment method of a guarantor. In some embodiments, in the event of nonpayment by a group member, group bill payment server 106 does not transmit a payment to provider 110 and skip 408 is skipped.

Consistent with disclosed embodiments, in some embodiments, any of steps 402-416 of process 400 may be performed by a container instance.

Figure 5:
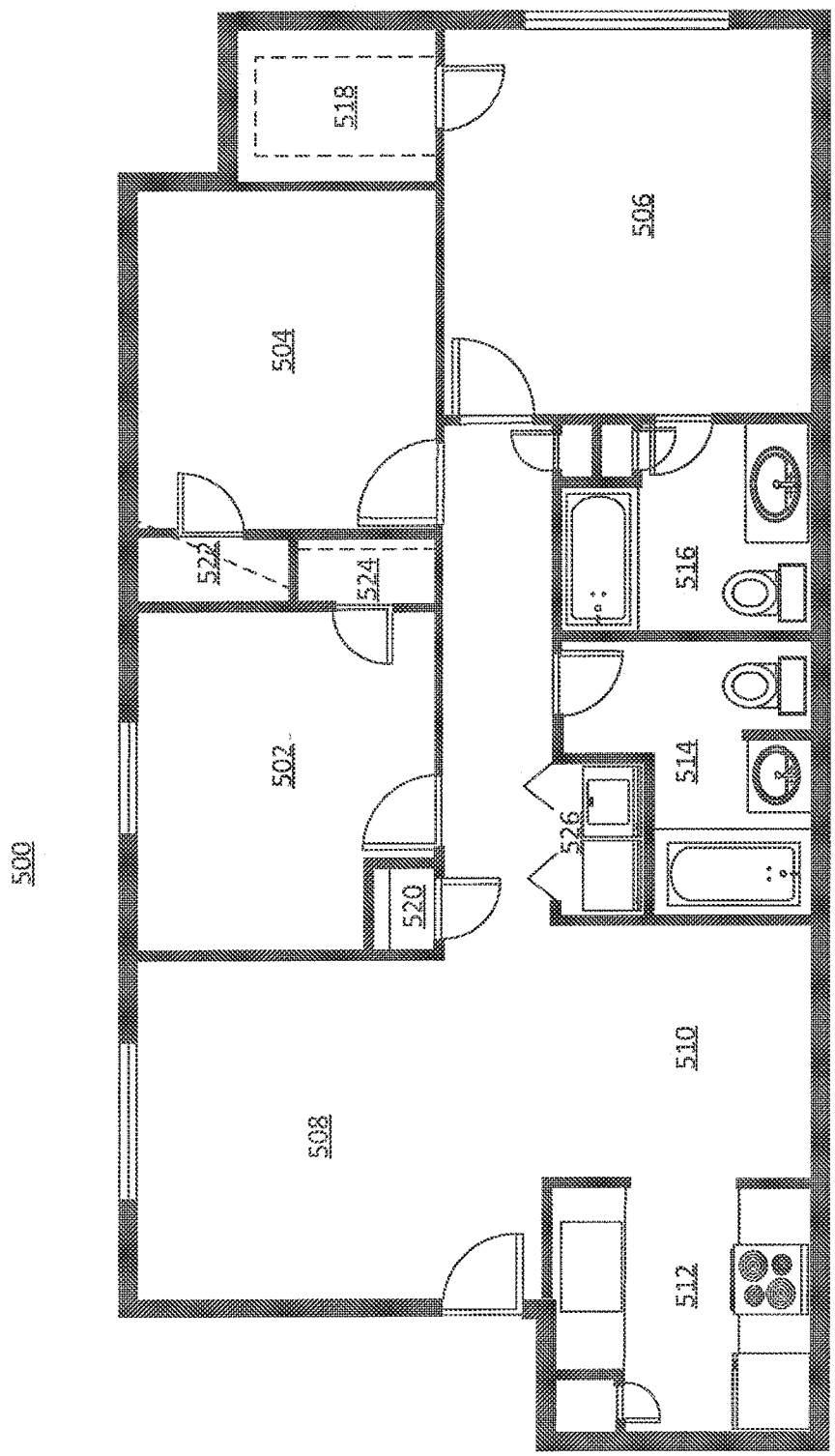
FIG. 5 is a diagram of an exemplary apartment shared by group members, consistent with disclosed embodiments.

FIG. 5 shows diagram 500 of an exemplary apartment shared by group members, consistent with disclosed embodiments.

Consistent with disclosed embodiments, creating a rule for group bill payment based on usage may comprise creating a rule for group bill payment based on diagram 500. The rule may comprise a percentage of a bill owed by a group member based on an area associated with a group member.

In some embodiments, three group members may reside in apartment in rooms 502, 504, and 506. That is, three group members may be apartment-mates. As shown in FIG. 5, apartment-mates residing in room 502, 504, and 506 use corresponding closets 522, 524, and 518. Rooms 508, 510, 512, 520, and 526 represent a shared living room, a shared dining room, a shared kitchen, a shared utility closet, and a shared laundry room, respectively. In the example of FIG. 5, apartment-mates residing in rooms 502 and 504 share bathroom 514, while an apartment mate residing in room 506 has exclusive use of bathroom 516.

Considering this example, group members residing in rooms 502, 504, and 506 may be associated with a respective proportion of the apartment area. Respective proportions may be determined by summing the all areas of associated with a particular group member, including shared and exclusive-use areas, and dividing by the total area of the apartment.

In some embodiments, the respective proportion may change based on a change in the area associated with a group member, resulting in a modification to a rule. For example, a group member 506 may stop using kitchen 512, or may offer use of closet 518 to a user residing in room 502.

In some embodiments, the rule may be based on a weighting function. For example, the rule may assign a weight to each room 502-518 based on the perceived value of the respective room. Room 506 may be assigned a high weight owing to its greater privacy, while room 504 may be assigned a lower rate than room 502 because it may lack a window. Other arrangements are possible.

In some embodiments, more than one group member resides in at least one of rooms 502, 504, or 506. That is the group may comprise apartment-mates and roommates. The rule for group bill payment may be based on the group members status as an apartment-mate and roommate.

For example, four apartment mates may share the apartment depicted in diagram 500. Two roommates may reside in room 506. In this example, the group bill payment server may first specify a collective percentage owed collectively by both roommates in room 506, then specify a relative share of the collective percentage to each roommate. The relative share may be based on any criteria. As will be appreciated by one of skill in the art, other arrangements are possible.

Systems and methods disclosed herein involve unconventional improvements over conventional communal or group bill payment systems. As compared to conventional technologies for group bill payment, embodiments of the invention reduce risk and increase convenience.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, NodeJS, C #, GO, Python, Ruby, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system, comprising:
one or more hardware processors and memory storing instructions executable by the one or more hardware processors to perform operations comprising:
in response to a triggering event related to usage of a service provided by a provider to a group, generating a container instance on a server, wherein the container instance is a closed container, and wherein the container instance is an ephemeral container instance that is provisioned based on the triggering event and terminated upon completion of a job;
creating a group contribution account, wherein the group contribution account is configured to receive a plurality of contribution methods from the group and transmit a group contribution to the provider;
determining, via the container instance, a group member requirement based on text data related to the triggering event;
sending, via the container instance, a contribution request to a first group member of the group based on the group member requirement;
receiving, via the container instance, a deposit into the group contribution account from the first group member based on the contribution request;

transmitting, via the container instance, the group contribution from the group contribution account to the provider, the group contribution being based on the textual document; and terminating the container instance.

2. A method, comprising:

in response to a triggering event related to usage of a service, generating a container instance on a server, wherein the container instance is a closed container, and wherein the container instance is an ephemeral container instance that is provisioned based on the triggering event and terminated upon completion of a job;

creating a group contribution account, wherein the group contribution account is configured to receive a plurality of contribution methods from a group;

determining, via the container instance, a group member requirement based on text data related to the triggering event;

sending, via the container instance, a contribution request to a first group member of the group based on the group member requirement;

receiving, via the container instance, a deposit into the group contribution account from the first group member;

transmitting, via the container instance, a group contribution from the group contribution account to a provider; and terminating the container instance.

3. The method of claim 2, further comprising:

receiving an image of a textual document;

using, via the container instance, optical character recognition to generate the text data based on the image;

using the text data to generate a rule for sending a request to one or more members of the group; and storing the text data and the rule in a database, wherein the database is used to provide information to facilitate the group contribution.

4. The method of claim 2, further comprising:

identifying the first group member based on the text data;

determining, via the container instance, an amount owed by the first group member based on the text data;

determining the group contribution account;

generating instructions for the first group member to send the amount owed to the group contribution account; and generating a rule for sending a request for contribution to one or more members of the group, wherein the rule comprises the amount owed, the first group member, the group contribution account, and the instructions to send the contribution request to the first group member, and wherein the group member requirement is determined based on the rule.

5. The method of claim 4, wherein generating the rule comprises:

determining, via the container instance, the first group member based on generated text data;

determining the amount owed based on a usage rate; and updating the rule to reflect the amount owed.

6. The method of claim 4, wherein generating the rule comprises:

determining, via the container instance, the first group member based on the text data;

modifying the contribution request based on an external factor, wherein the external factor determines the amount owed by the first group member; and updating the rule to reflect the amount owed.

7. The method of claim 6, wherein the external factor comprises weighted components, and wherein the weighted components alter the contribution request for the first group member in the rule used by the container instance.

8. The method of claim 4, wherein generating the rule comprises:

determining, via the container instance, weights based on the text data; and using the weights to modify the rule, wherein the weights modify, via the container instance, the rule such that the rule changes the amount owed by the first group member.

9. The method of claim 8, wherein modifying, via the container instance, the rule comprise one of adding a group member to the group contribution account or deleting a group member of the group from the group contribution account.

10. The method of claim 8, wherein modifying, via the container instance, the rule comprise at least one of changing a contribution method or changing a predetermined percentage.

11. The method of claim 4, further comprising:

modifying, via the container instance, the rule to send, based on noncontribution by at least one group member, a second contribution request;

determining the second contribution request was delivered; and sending, based on the noncontribution by the at least one group member, a noncontribution notification to one or more other members of the group.

12. One or more non-transitory, computer-readable media comprising instructions recorded thereon that when executed by one or more processors causes operations comprising:

in response to a triggering event related to usage of a service, generating a container instance on a server, wherein the container instance is a closed container, and wherein the container instance is an ephemeral container instance that is provisioned based on the triggering event and terminated upon completion of a job;

creating a group contribution account, wherein the group contribution account is configured to receive a plurality of contribution methods from a group;

determining a group member requirement based on text data related to the triggering event;

sending, via the container instance, a contribution request to a first group member based on the group member requirement;

receiving, via the container instance, a deposit into the group contribution account from the first group member;

transmitting, via the container instance, a group contribution from the group contribution account to a provider; and terminating the container instance.

13. The one or more non-transitory, computer-readable media of claim 12, the operations further comprising:

receiving an image of a textual document the image;

using optical character recognition to generate the text data based on the image;

using the text data to generate a rule for sending a request to one or more members of the group; and storing the text data and the rule in a database, wherein the database is used to provide information to facilitate the group contribution.

14. The one or more non-transitory, computer-readable media of claim 12, the operations further comprising:
 identifying the first group member based on the text data;
 determining an amount owed by the first group member based on the text data;
 determining the group contribution account;
 generating instructions for the first group member to send the amount owed to the group contribution account; and
 generating a rule or sending a request for contribution to one or more members of the group, wherein the rule comprises the amount owed, the first group member, the group contribution account, and the instructions to send the contribution request to the first group member, and wherein the group member requirement is determined based on the rule.

15. The one or more non-transitory, computer-readable media of claim 14, wherein generating the rule comprises:
 determining the first group member based on the text data;
 determining the amount owed based on a usage rate; and
 updating the rule to reflect the amount owed.

16. The one or more non-transitory, computer-readable media of claim 14, wherein generating the rule comprises:
 determining the first group member based on the text data;
 modifying the contribution request based on an external factor, wherein the external factor determines the amount owed by the first group member; and
 updating the rule to reflect the amount owed.

17. The one or more non-transitory, computer-readable media of claim 16, wherein the external factor comprises weighted components, and wherein the weighted components alter the contribution request for the first group member in the rule.

18. The one or more non-transitory, computer-readable media of claim 14, wherein generating the rule comprises:
 determining weights based on the text data; and
 using the weights to modify the rule, wherein the weights modify the rule such that the rule changes the amount owed by the first group member.

19. The one or more non-transitory, computer-readable media of claim 14, wherein the instructions to modify the rule comprise one of adding a group member to the group contribution account or deleting the one or more members of the group from the group contribution account.

20. The one or more non-transitory, computer-readable media of claim 14, the operations further comprising:
 modifying the rule to send, based on noncontribution by at least one group member, a second contribution request;
 determining the second contribution request was delivered; and
 sending, based on the noncontribution by the at least one group member, a noncontribution notification to one or more other members of the group.

\* \* \* \* \*